United States Patent
Lin et al.

(10) Patent No.: US 11,582,585 B2
(45) Date of Patent: *Feb. 14, 2023

(54) BANDWITH-EFFICIENT LOCATION TRACKING

(71) Applicant: iSharingSoft, Inc., Irvine, CA (US)

(72) Inventors: Yi-Ling Lin, Moreno Valley, CA (US); Yongjae Chuh, Irvine, CA (US); Hae Kyung Cho, Irvine, CA (US)

(73) Assignee: ISHARINGSOFT, INC., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/471,866

(22) Filed: Sep. 10, 2021

(65) Prior Publication Data

US 2022/0103975 A1 Mar. 31, 2022

Related U.S. Application Data

(63) Continuation of application No. 17/036,238, filed on Sep. 29, 2020, now Pat. No. 11,140,519.

(51) Int. Cl.
*H04W 24/00* (2009.01)
*H04W 4/029* (2018.01)
*H04W 4/02* (2018.01)

(52) U.S. Cl.
CPC .......... *H04W 4/029* (2018.02); *H04W 4/023* (2013.01); *H04W 4/027* (2013.01)

(58) Field of Classification Search
CPC ...... H04W 4/029; H04W 4/023; H04W 4/027
See application file for complete search history.

(56) References Cited

U.S. PATENT DOCUMENTS

| | | | |
|---|---|---|---|
| 11,140,519 B1* | 10/2021 | Lin | G01S 5/0205 |
| 2014/0278044 A1* | 9/2014 | Jacobs | G08G 1/096844 701/300 |
| 2015/0358784 A1* | 12/2015 | Liao | H04W 4/025 455/456.1 |

* cited by examiner

*Primary Examiner* — Erika A Washington
(74) *Attorney, Agent, or Firm* — Tutunjian & Bitetto, P.C.

(57) ABSTRACT

Methods and systems for transmitting location updates include determining a deviation distance, based on an extrapolated travel direction and an actual travel direction from a last updated location. It is determined that the deviation distance exceeds a deviation threshold. A location update is transmitted to a tracking server, responsive to the determination that the deviation distance exceeds the deviation threshold.

16 Claims, 6 Drawing Sheets

ða # BANDWITH-EFFICIENT LOCATION TRACKING

BACKGROUND OF THE INVENTION

The present invention relates to location tracking, and, more particularly, to filtering location updates from devices to decrease the amount of bandwidth being transmitted across a fleet of such devices.

Many devices come equipped with location-tracking capabilities, such as global positioning satellite (GPS) receivers. These devices can locate their position with a high degree of precision. This, combined with the ubiquity of wireless data transmission capabilities, makes it possible for devices to provide real-time location information, making it possible to track these devices as they move.

However, in a system that tracks a large number of such devices, the amount of bandwidth needed to handle constant updates from every device can be excessive.

BRIEF SUMMARY OF THE INVENTION

A method for transmitting location updates include determining a deviation distance, based on an extrapolated travel direction and an actual travel direction from a last updated location. It is determined that the deviation distance exceeds a deviation threshold. A location update is transmitted to a tracking server, responsive to the determination that the deviation distance exceeds the deviation threshold.

A method for tracking a location of a device includes determining a deviation distance, based on an extrapolated travel direction and an actual travel direction from a last updated location, by determining an angle θ between the extrapolated travel direction and the actual travel direction, and multiplying an actual travel distance from the last updated location by sin(θ). A deviation threshold is determined by comparing a current speed to a speed threshold. It is determined that the deviation distance exceeds a deviation threshold. Location updates are transmitted from a device to a tracking server, responsive to the determination that the deviation distance exceeds the deviation threshold. A location of the device over time, based on the location updates, with the location of the device being extrapolated between location updates A system for tracking a location of a device includes a hardware processor, a network interface, and a memory. The memory is configured to store a computer program product that, when executed by the hardware processor, causes the hardware processor to implement a location updater. The location updater is configured to determine a deviation distance, based on an extrapolated travel direction and an actual travel direction from a last updated location, to determine that the deviation distance exceeds a deviation threshold, and to trigger the network interface to transmit a location update to a tracking server, responsive to the determination that the deviation distance exceeds the deviation threshold.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Embodiments of the present principles provide location tracking that is sensitive to a device's location and speed, making it possible to filter out location updates that do not deviate substantially from an expected location. To accomplish this, the present embodiments may determine a measurement of deviation from a previous path. When this measurement of deviation exceeds a threshold value, the present embodiments may transmit a location update. When the new location provides a measurement of deviation that is below the threshold value, the location update may be skipped, thereby reducing total information transmitted across a network.

Figure 1:
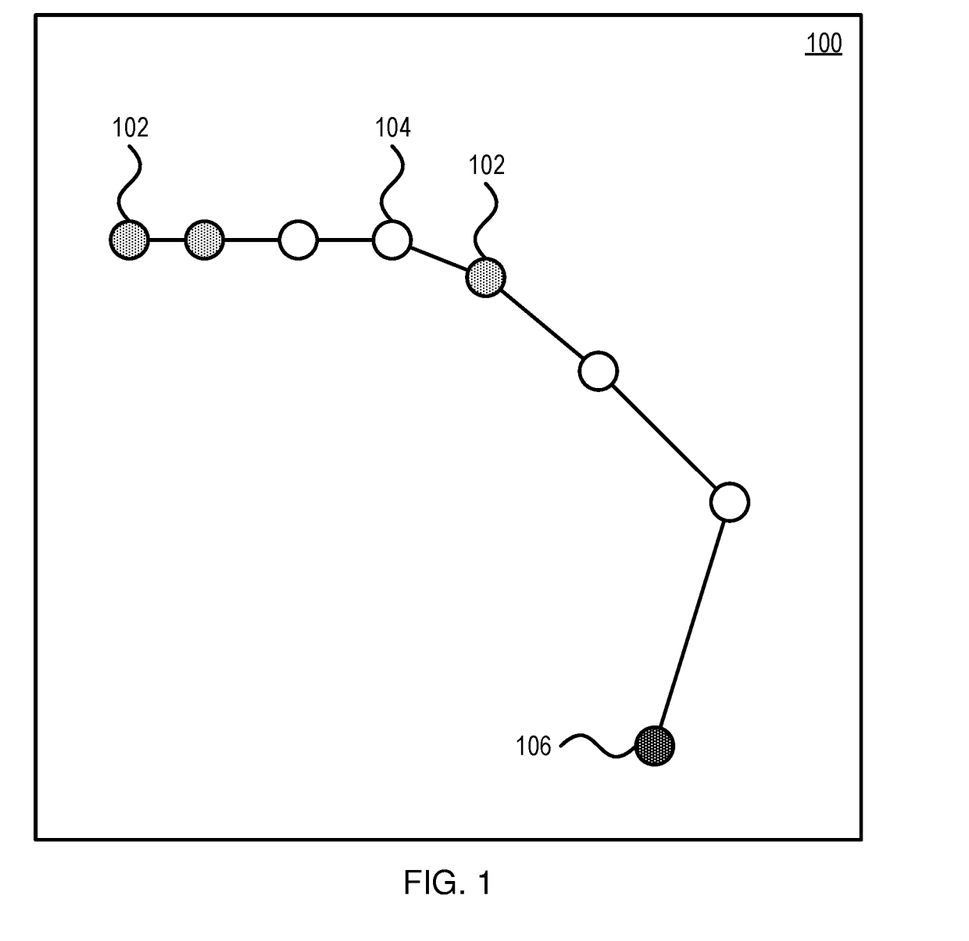
FIG. 1 is a diagram of a series of location measurements by a device, with some that have been transmitted to a tracking server and some that have not, in accordance with an embodiment of the present invention.

Referring now to FIG. 1, an exemplary map 100 is shown, with a series of tracked locations being shown. The device transmits certain locations 102 as described below, but refrains from transmitting certain other locations 104. A current location 106 is shown as well. In this example, the device determines its location periodically, at consistent time intervals, such that larger distances between locations corresponds to a higher speed. It should be understood, however, that a device may make location measurements at any appropriate interval, including aperiodic intervals, and may alternatively be triggered to make location measurements according to any appropriate trigger.

At each measurement, the device makes a determination of whether to transmit the location, for example, according to the device's speed and an amount deviation from a course that the device was previously on.

Figure 2:
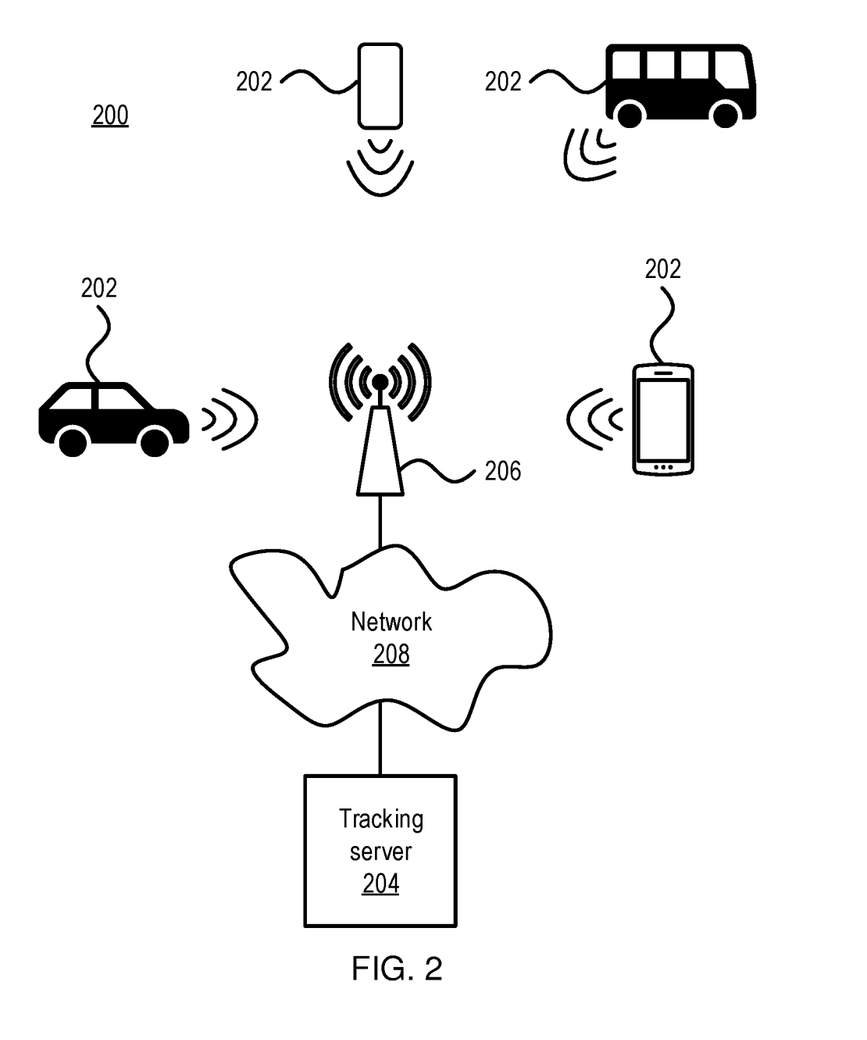
FIG. 2 is a diagram of a set of location-aware devices that report their locations to a tracking server via a network, in accordance with an embodiment of the present invention.

Referring now to FIG. 2, a tracking system 200 is shown, with multiple devices 202. These devices may include any appropriate system with the ability to determine its own location. It is specifically contemplated that GPS may be used for this purpose, but it should be understood that other location measurement and estimation systems exist, such as those which use proximity to known wireless hotspots and those which use cell phone tower associations. Exemplary devices include mobile computing devices, cell phones, personal vehicles (e.g., using a car area network), municipal vehicles (e.g., transit and waste management), corporate fleet vehicles, biometric personal tracker devices, smart watches, etc.

Regardless of the mechanism, each device 202 is able to determine its location in space with some degree of accuracy. Additionally, each device 202 is capable of communicating data over a network 208, such as the internet or a corporate intranet. This communication can take any appropriate form, though it is specifically contemplated that the devices 202 may communicate wirelessly with a transceiver 206, for example in the form of a cell tower or wireless access point.

The devices 202 thereby communicate with a tracking server 204, via the network 208. Each device 202 provides location updates to the tracking server 204, and these updates may include such information as longitude and latitude coordinates, a degree of positional uncertainty, a proximity to a landmark (e.g., to the transceiver 206), other positional information, or some combination of these. The location updates may further include ancillary data, such as speed, identification, device status information (e.g., battery life), etc.

The tracking server 204 keeps a record of the reported location information from each device 202. The tracking server 204 can then build reports on the device's position over time, showing the paths it travels and providing information about its whereabouts and activities. For example, a parent can track a child's cellphone through the day, to identify if the child is in a dangerous situation. In another example, a fleet of vehicles can be tracked, to ensure that they are being used for appropriate purposes and, in some cases, to gather information for insurance purposes. In yet another example, a municipal transit system may track its buses and trains, providing current information for travelers seeking to catch a ride.

Between location updates, the tracking server 204 can infer the position of the devices 202. For example, if a given device 202 is normally configured to send an update every minute, then the tracking server can use previously recorded information to determine the device's current position, until a new location update is received. In some embodiments, the device's speed can be calculated from the previous updates, for example by dividing a distance between updates by a time between updates. The device's position can then be extrapolated from the last received update, using the calculated speed and an assumption that the device is continuing in the same direction as was indicated by the two previous location updates.

As the number of devices 202 increases, the number of location updates being sent will tend to increase proportionally. If the tracking server 204 manages many such devices, the volume of information traveling through the network 206 may exceed the available network bandwidth. This may result in important location updates being missed, tracking accuracy being degraded, and overall quality of the tracking product decreasing.

To avoid this problem, the devices 202 may be configured to selectively filter their location updates. The devices 202 may maintain a record of their own locations and, based on how a latest location measurement compares to previous measurements, may omit certain updates that do not substantially deviate from the device's recent behavior. The tracking system 204 can then extrapolate from the most recently received updates, providing tracking information that remains accurate, despite lacking the most up-to-date location measurements.

Figure 3:
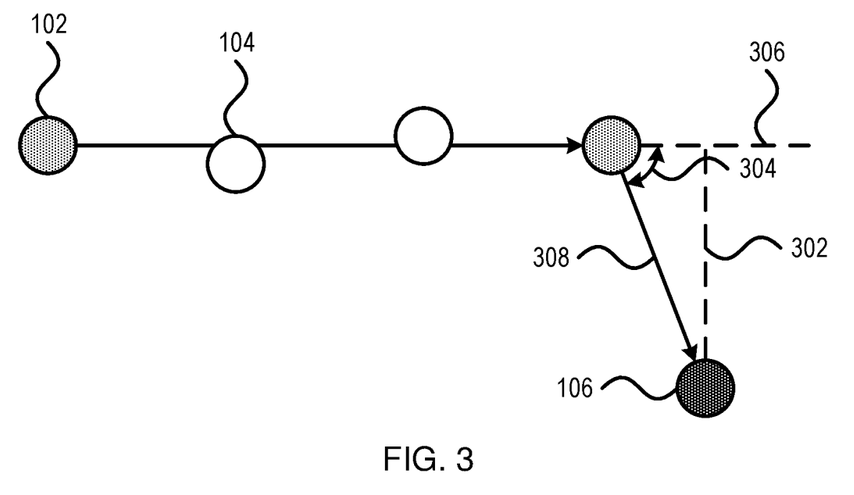
FIG. 3 is a series of location measurements of a device, with angles and distances being used to determine whether to send a latest location measurement to a tracking server, in accordance with an embodiment of the present invention.

Referring now to FIG. 3, a series of location measurements of a particular device 202 is shown. The are two reported measurements 102 and two unreported measurements 104. A line connects the two reported measurements 102. This line can be extrapolated to establish an expected direction of motion 306 of the device 202. The unreported measurements 104 are shown with relatively small deviations from the line 306.

A latest measurement 106 is shown with a significant deviation from the line 306. To characterize the deviation, a deviation distance 302 may be determined. To find the deviation distance 302, the sine may be calculated of the angle 304 between the line 306 and a line 308 connecting the last reported measurement 102 and the current position 106. This sine value may then be multiplied by the length of the connecting line 108 to determine the deviation distance 302.

If this deviation distance 302 falls within a threshold value, then the latest location measurement 106 may be filtered, such that it is not reported to the tracking server 204. Even if the location measurement is not reported, it may be stored on the device 202. For example, if an unreported location measurement is followed by a location measurement with a significant deviation distance 302, then the unreported location measurement may be belatedly reported, to provide the tracking server 204 with a last reported point along an extrapolated line, recorded before the device 202 is shown to take a turn.

The threshold value can vary, for example based on the speed of the device 202. The speed can be determined based on the distance between subsequent detected locations and the elapsed time between those location measurements. For example, a device may move more slowly when traveling along city streets than when the device is traveling along a highway. To maintain an accurate view of the device's path, a smaller threshold may be used when the device is moving slower, and a larger threshold may be used when the device is moving faster. Thus, a slower speed for the device 202 may result in more frequent location updates over a given distance.

Figure 4:
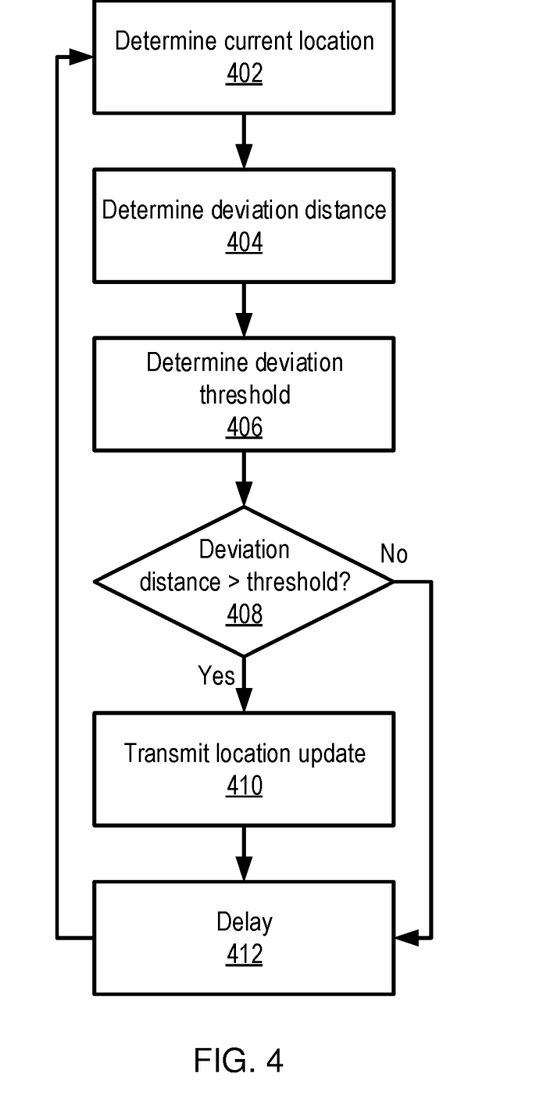
FIG. 4 is a block/flow diagram of determining whether to transmit a location update to a tracking server, in accordance with an embodiment of the present invention.

Referring now to FIG. 4, a location update loop is shown. This loop may be performed on a device 202, to determine whether to transmit a location update to the tracking server 204. Block 402 determines the current location of the device 202, for example using a GPS receiver or any other appropriate location-finding process. Block 404 then calculates the deviation distance 302, as described in greater detail below. As noted above, the deviation distance 302 may represent a distance that the device 202 has deviated from a path that is extrapolated from previous location measurements.

Block 406 determines a deviation threshold, as described in grater detail below. Block 408 compares the deviation distance 302 to the deviation threshold. If the deviation distance 302 exceeds the deviation threshold, then block 410 transmits a location update to the tracking server 204 to reflect the current location. After transmitting the location update in block 410, or if the deviation distance 302 was found not to exceed the deviation threshold in block 408, processing proceeds to block 412, where a delay may be performed before a next location is determined in block 402. This delay may be set according to a fixed period (e.g., with location measurements every second or minute), according to device speed (e.g., with updates being performed more frequently at higher speeds), according to some triggering event (e.g., a high acceleration being detected), or in any other appropriate manner.

Figure 5:
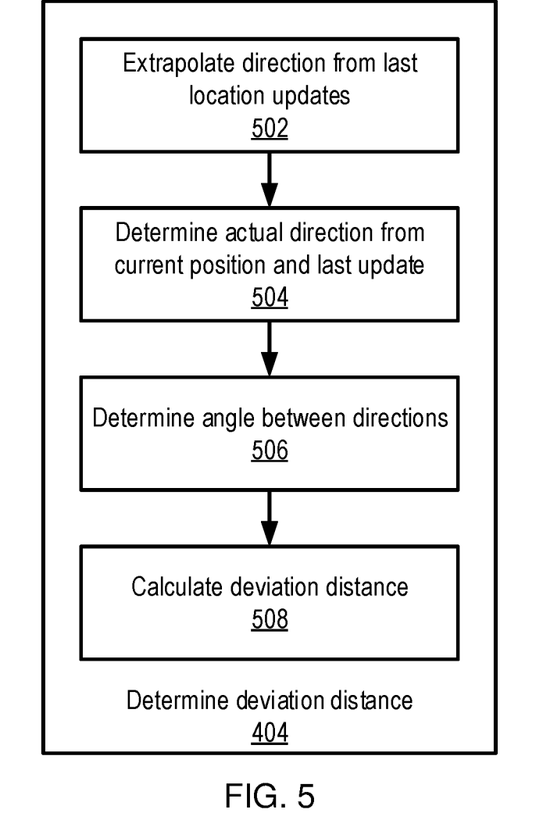
FIG. 5 is a block/flow diagram of determining a deviation distance, which can be used to determine whether to transmit a location update to a tracking server, in accordance with an embodiment of the present invention.

Referring now to FIG. 5, additional detail is provided for determining the deviation distance in block 404. Block 502 extrapolates a travel direction 306 from previous location updates, for example by identifying a direction of travel to the location last update, from the location update before that, represented in any appropriate coordinate system. Block 504 then determines the actual direction traveled by the device 202, for example by identifying a direction of travel from the last location update, to the present location, as measured by block 402. Notably blocks 502 and 504 may operate specifically with update locations, rather than merely measured locations, using locations that were transmitted to the tracking server 204.

Block 506 determines the angle 304 between the directions that are determined in blocks 502 and 504. Representing the directions as unit vectors, with a representing the extrapolated direction from block 502, and b representing the actual direction from block 504, then the angle 304 can be determined as, e.g., $$\theta = \cos^{-1}\left(\frac{a \cdot b}{|a||b|}\right),$$

with • representing the dot product.

Using the angle 304, and the actual traveled distance 308, measured between the current location and the last update location, block 508 can calculate the deviation distance 302. In particular, it is contemplated that the deviation distance may be calculated as d=c×sin (θ), where c is the actual traveled distance 308.

Figure 6:
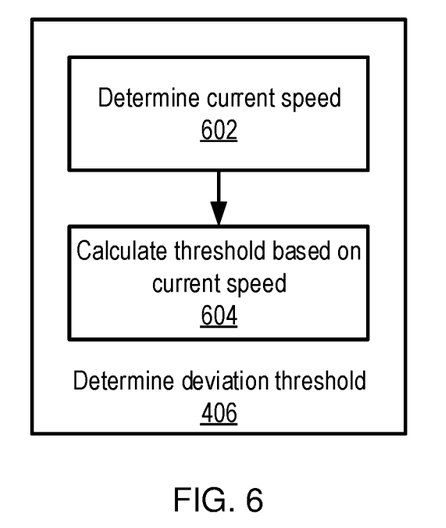
FIG. 6 is a block/flow diagram of determining a deviation threshold, which can be used to determine whether to transmit a location update to a tracking server, in accordance with an embodiment of the present invention.

Referring now to FIG. 6, additional detail is provided for determining the deviation threshold. Block 602 determines a current speed, for example by finding the distance between the current location and the last measured location. The current speed can then be determined by dividing this distance by the time elapsed between location measurements. It should be noted that this speed, being measured from the last measured location, rather than the last updated location, reflects a more accurate speed than would be found if it were measured using the distance from the last updated location.

Block 604 calculates the deviation threshold, based on the current speed. In some embodiments, the deviation threshold may be selected from two or more options. In such embodiments, one or more speed thresholds may be used to assign particular thresholds to respective speed ranges. In some embodiments, a function may be used to provide a continuously varying threshold, based on the speed.

For example, for speeds faster than 20 m/s, the vehicle may be considered to be moving at high speed, and the deviation distance threshold may be set to an exemplary 10 m. For speeds between 20 m/s and 10 m/s, the vehicle may be considered to be moving at a medium speed, and the deviation distance threshold may be set to an exemplary 6 m. For speeds below 10 m/s, the vehicle may be considered to be moving at a low speed, and the deviation distance threshold may be set to an exemplary 3 m. Although three speed ranges are given in this example, it should be understood that any number of thresholds may be used instead.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The present embodiments may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 7:
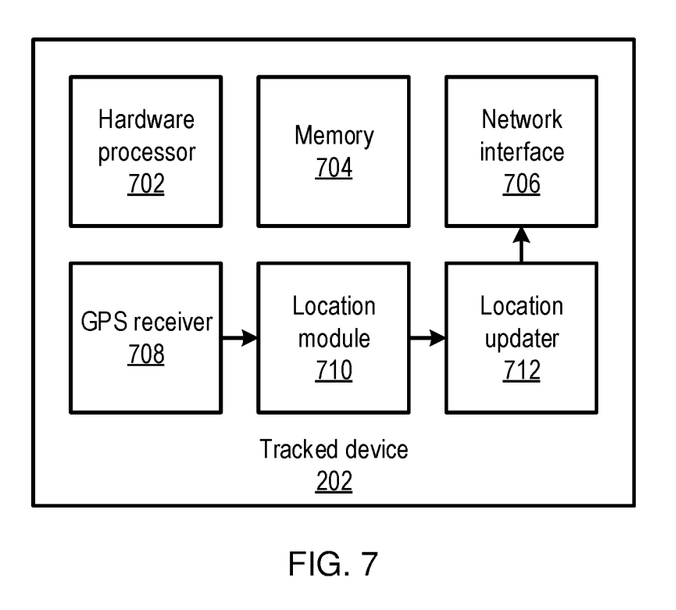
FIG. 7 is a block diagram of a tracked device, which selectively reports location updates to a tracking server, in accordance with an embodiment of the present invention.

Referring now to FIG. 7, additional detail on the tracked device 202 is shown. The device 202 may be a standalone device, or may be part of a larger system, such as a vehicle or smart phone. Thus, although the tracked device 202 is shown as including various hardware features, it should be understood that those hardware features may be shared with other functions within the device.

The device 202 include a hardware processor 702 and a memory 704. A network interface 706 provides communications between the device 202 and, for example, a tracking server 204. As noted above, the network interface 706 is specifically contemplated as being a wireless interface, such as one that uses a cellphone network or an IEEE 802.11 standard. It is also contemplated that the network interface 706 may include a wired interface, if such can be implemented while permitting the device 202 to move and be tracked. Thus, the network interface 706 communicates using any appropriate wired or wireless communication medium and protocol.

The device 202 is shown to include a GPS receiver 708, which receives signals from positioning satellites and translates those signals into geographic coordinates, such as a longitude and latitude. Although the use of GPS location-finding is specifically contemplated, it should be understood that any appropriate location-finding process may be used instead. For example, location module 710 may use information from the network interface 706, relating to communications infrastructure such as cell towers or wireless access points, to identify a geographic area that is associated with the communications infrastructure. The location module 710 may store measured location information in the memory 704, to maintain an accurate location history.

A location updater 712 may format the location information in a manner that is suitable for use by the tracking server 204. The location updater 712 also applies a filter, to determine whether to send the location update to the tracking server 204. Using, for example, the deviation distance 302 and the deviation threshold described above, the location updater 712 may filter out location updates that are not sufficiently different from an extrapolated direction, and which may therefore be accurately inferred by the tracking server 204. If the deviation distance 302 does exceed the deviation threshold, then location updater 712 may use the network interface 706 to transmit the location update.

In some embodiments, the location updater 712 may respond to requests from the tracking server 204. For example, the tracking server 204 may issue a request for an updated location, which may trigger a new location measurement (per block 402) and may cause the location updater 712 to override the filter, providing the location update even in cases where the update might otherwise have been filtered. In some embodiments, the tracking server 204 may also request historical measurements, including measurements that may otherwise have been filtered. In such an event, the location updater 712 may access location measurements that are stored by location module 710 in the memory 704. Any appropriate number of past location measurements may be stored and accessed in this way, thereby providing the device's full tracking history on request.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method, comprising:
   determining a current speed based on a distance, between a current location and a previously measured, un-transmitted location, and a time elapsed between a measurement of the current location and a measurement of the previously measured, un-transmitted location;

determining a deviation threshold by comparing the current speed to both of a first threshold and to a second threshold, where a first deviation threshold value is selected for a current speed that exceeds the first threshold and the second threshold, a second deviation threshold value is selected for a current speed that falls between the first threshold and the second threshold, and a third deviation threshold value is selected for a current speed that falls below the first threshold and the second threshold;

determining a deviation distance, based on an extrapolated travel direction and an actual travel direction from a last updated location;

determining that the deviation distance exceeds the deviation threshold; and transmitting a location update to a tracking server, responsive to the determination that the deviation distance exceeds the deviation threshold.

2. The method of claim 1, wherein determining the deviation distance comprises determining an angle θ between the extrapolated travel direction and the actual travel direction.

3. The method of claim 1, further comprising determining the actual travel direction as a direction from the last updated location to the current location.

4. The method of claim 1, wherein the first threshold is 10 m/s and the second threshold is 20 m/s, and wherein the first deviation threshold value is 10 m, the second deviation threshold value is 6 m, and the third deviation threshold value is 3 m.

5. A system, comprising:
a hardware processor;
a network interface; and
a memory, configured to store a computer program that, when executed by the hardware processor, causes the hardware processor to:
determine a current speed based on a distance, between a current location and a previously measured, un-transmitted location, and a time elapsed between a measurement of the current location and a measurement of the previously measured, un-transmitted location;
determine a deviation threshold by comparing the current speed to both of a first threshold and to a second threshold, where a first deviation threshold value is selected for a current speed that exceeds the first threshold and the second threshold, a second deviation threshold value is selected for a current speed that falls between the first threshold and the second threshold, and a third deviation threshold value is selected for a current speed that falls below the first threshold and the second threshold;
determine a deviation distance, based on an extrapolated travel direction and an actual travel direction from a last updated location;
determine that the deviation distance exceeds the deviation threshold; and
transmit a location update to a tracking server, responsive to the determination that the deviation distance exceeds the deviation threshold, using the network interface.

6. The system of claim 5, wherein the computer program further causes the hardware processor to determine an angle θ between the extrapolated travel direction and the actual travel direction.

7. The system of claim 5, wherein the computer program further causes the hardware processor to determine the actual travel direction as a direction from the last updated location to the current location.

8. The system of claim 7, wherein the first threshold is 10 m/s and the second threshold is 20 m/s, and wherein the first deviation threshold value is 10 m, the second deviation threshold value is 6 m, and the third deviation threshold value is 3 m.

9. A method, comprising:
determining a deviation distance, based on an extrapolated travel direction and an actual travel direction from a last updated location;
determining a deviation threshold, by comparing a current speed to both of a first threshold and to a second threshold, where a first deviation threshold value is selected for a current speed that exceeds the first threshold and the second threshold, a second deviation threshold value is selected for a current speed that falls between the first threshold and the second threshold, and a third deviation threshold value is selected for a current speed that falls below the first threshold and the second threshold;
determining that the deviation distance exceeds the deviation threshold; and
transmitting a location update to a tracking server, responsive to the determination that the deviation distance exceeds the deviation threshold.

10. The method of claim 9, wherein determining the deviation distance comprises determining an angle θ between the extrapolated travel direction and the actual travel direction.

11. The method of claim 9, further comprising determining the actual travel direction as a direction from the last updated location to the current location.

12. The method of claim 9, wherein the first threshold is 10 m/s and the second threshold is 20 m/s, and wherein the first deviation threshold value is 10 m, the second deviation threshold value is 6 m, and the third deviation threshold value is 3 m.

13. A system, comprising:
a hardware processor;
a network interface; and
a memory, configured to store a computer program that, when executed by the hardware processor, causes the hardware processor to:
determine a deviation distance, based on an extrapolated travel direction and an actual travel direction from a last updated location;
determine a deviation threshold, by comparing a current speed to both of a first threshold and to a second threshold, where a first deviation threshold value is selected for a current speed that exceeds the first threshold and the second threshold, a second deviation threshold value is selected for a current speed that fails between the first threshold and the second threshold, and a third deviation threshold value is selected for a current speed that falls below the first threshold and the second threshold;
determine that the deviation distance exceeds the deviation threshold; and transmit a location update to a tracking server, responsive to the determination that the deviation distance exceeds the deviation threshold, using the network interface.

14. The system of claim 13, wherein the computer program further causes the hardware processor to determine an angle θ between the extrapolated travel direction and the actual travel direction.

15. The system of claim 13, wherein the computer program further causes the hardware processor to determine the actual travel direction as a direction from the last updated location to the current location.

16. The system of claim 13, wherein the first threshold is 10 m/s and the second threshold is 20 m/s, and wherein the first deviation threshold value is 10 m, the second deviation threshold value is 6 m, and the third deviation threshold value is 3 m.

* * * * *